United States Patent
Inami et al.

(10) Patent No.: US 12,179,733 B2
(45) Date of Patent: Dec. 31, 2024

(54) TRAVEL CONTROL DEVICE AND TRAVEL CONTROL METHOD

(71) Applicant: Hitachi Astemo, Ltd., Hitachinaka (JP)

(72) Inventors: Ken Inami, Ibaraki (JP); Noriyuki Komatsu, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 205 days.

(21) Appl. No.: 18/008,396

(22) PCT Filed: Feb. 5, 2021

(86) PCT No.: PCT/JP2021/004272
§ 371 (c)(1),
(2) Date: Dec. 5, 2022

(87) PCT Pub. No.: WO2021/250936
PCT Pub. Date: Dec. 16, 2021

(65) Prior Publication Data
US 2023/0286478 A1   Sep. 14, 2023

(30) Foreign Application Priority Data
Jun. 12, 2020 (JP) .................... 2020-102573

(51) Int. Cl.
*B60T 7/12* (2006.01)
*B60T 8/1755* (2006.01)
(Continued)

(52) U.S. Cl.
CPC ...... *B60T 8/58* (2013.01); *B60T 7/12* (2013.01); *B60T 8/17558* (2013.01);
(Continued)

(58) Field of Classification Search
CPC ........ B60T 7/12; B60T 8/17558; B60T 8/246; B60T 8/58; B60T 8/86; B60T 2210/32;
(Continued)

(56) References Cited

U.S. PATENT DOCUMENTS

2017/0361841 A1   12/2017 Kojo
2019/0375430 A1*  12/2019 Emura .................... G08G 1/16
(Continued)

FOREIGN PATENT DOCUMENTS

JP   2009/096361 A   5/2009
JP   2010/033441 A   2/2010
(Continued)

OTHER PUBLICATIONS

English machine translation of JP 2017-222317; Dec. 2017 (Year: 2017).*
(Continued)

*Primary Examiner* — Erick R Solis
(74) *Attorney, Agent, or Firm* — Foley & Lardner LLP (57) ABSTRACT

A travel control device that prevents malfunctioning of an intersection AEB system is provided. The travel control device includes a sensor that detects the front side, and a control unit that controls a brake, based on information from the sensor. When determining that a host vehicle is going to traverse an intersection and make a turn, the control unit carries out control for controlling the brake when the speed of an oncoming vehicle is equal to or higher than a given threshold. When determining that the oncoming vehicle detected by the sensor is going to traverse the intersection and make a turn, the control unit increases the threshold.

4 Claims, 8 Drawing Sheets

(51) Int. Cl.
   *B60T 8/24* (2006.01)
   *B60T 8/58* (2006.01)
   *B60T 8/86* (2006.01)
   *B60W 30/18* (2012.01)
   *G08G 1/16* (2006.01)

(52) U.S. Cl.
   CPC ............... *B60T 8/246* (2013.01); *B60T 8/86* (2013.01); *B60W 30/18159* (2020.02); *G08G 1/166* (2013.01); *B60T 2210/32* (2013.01); *B60W 2554/4042* (2020.02); *B60W 2554/4045* (2020.02)

(58) Field of Classification Search
   CPC ..... B60W 30/18154; B60W 30/18159; B60W 2554/4042; B60W 2554/4045
   USPC ...................................................... 701/70, 72
   See application file for complete search history.

(56) References Cited

U.S. PATENT DOCUMENTS

| | | | |
|---|---|---|---|
| 2020/0282997 A1 | 9/2020 | Ueda et al. | |
| 2020/0331466 A1* | 10/2020 | Ohmura | .......... B60W 30/18154 |
| 2021/0276546 A1* | 9/2021 | Rahman | ................ B60W 30/09 |
| 2022/0126830 A1* | 4/2022 | Yu | ..................... B60W 30/0956 |
| 2022/0144255 A1* | 5/2022 | Seong | ............... B60W 30/0953 |
| 2022/0161792 A1* | 5/2022 | Murata | ................. B60W 10/18 |
| 2023/0278581 A1* | 9/2023 | Ollis | ................. B60W 60/0011 701/23 |

FOREIGN PATENT DOCUMENTS

| | | |
|---|---|---|
| JP | 2011/215962 A | 10/2011 |
| JP | 2017/222317 A | 12/2017 |
| WO | WO 2019/073511 A1 | 4/2019 |

OTHER PUBLICATIONS

International Search Report with English Translation and Written Opinion in International Application No. PCT/JP2021/004272 dated Jun. 1, 2021.

\* cited by examiner

TRAVEL CONTROL DEVICE AND TRAVEL CONTROL METHOD

TECHNICAL FIELD

The present invention relates to a travel control device having an AEB function for preventing a collision with an oncoming vehicle at an intersection.

BACKGROUND ART

A conventional technique has been known, according to which a moving object, such as a different vehicle or a motorcycle, is detected by a camera or a radar incorporated in a host vehicle, an action of the moving object is predicted, based on the speed and the direction of the moving object, and when the risk of collision exists, the brake, the steering wheel, and the alarm of the host vehicle are controlled to inform the driver of the risk of a collision with the different vehicle and avoid the collision. In recent years, when a host vehicle turns right or left at an intersection, an autonomous emergency braking (AEB) system (intersection AEB system) plays an important role, the system reducing damage caused by a collision with an oncoming vehicle coming directly ahead, and properly controlling the intersection AEB system is required in such a situation.

PTL 1 (JP 2010-33441 A) describes a driving assist apparatus for vehicles that stops executing a process of predicting the start of an oncoming vehicle in a case where no oncoming vehicle is present at an intersection, in a case where a host vehicle travels straight or turns left at the intersection, in a case where an oncoming vehicle is in a right-turn lane or a left-turn lane, in a case where a blinker or hazard light of the oncoming vehicle is blinking, in a case where a parking lamp of the oncoming vehicle is on, in a case where a traffic light the host vehicle is facing indicates permission to a right turn, in a case where a traffic light the oncoming vehicle is facing is red, and in a case where a road ahead of the intersection that is on the oncoming vehicle side is congested, and that executes the process of predicting the start of the oncoming vehicle in cases different from the above cases. The driving assist apparatus for vehicles calculates the risk of collision with an obstacle to determine whether a possibility of the collision exists, and when the possibility of the collision exists, executes driving assist control, such as alarm output, autonomous braking, and steering, to ensure safety.

CITATION LIST

Patent Literature

PTL 1: JP 2010-33441 A

SUMMARY OF INVENTION

Technical Problem

The driving assist apparatus described in PTL 1 predicts whether the oncoming vehicle standing still starts running, from information on a surrounding environment at the intersection. However, when the oncoming vehicle comes into the intersection without stopping, the apparatus may be unable to determine whether the oncoming vehicle is going to travel straight or turn left or right, in which case, therefore, the oncoming vehicle on run is not taken into consideration. This leads to a problem that the intersection AEB system is not actuated when the oncoming vehicle comes into the intersection at a low speed.

An object of the present invention is to provide a travel control device that when determining that an oncoming vehicle is going to traverse an intersection and make a turn, increases a speed threshold for the oncoming vehicle, the speed threshold being a threshold at which an intersection AEB system is actuated, thereby preventing malfunctioning of the intersection AEB system.

Solution to Problem

A typical example of the present invention disclosed herein is as follows. A travel control device includes: a sensor that detects a front side; and a control unit that controls a brake, based on information from the sensor. When determining that a host vehicle is going to traverse an intersection and make a turn, the control unit carries out control for controlling the brake when a speed of an oncoming vehicle is equal to or higher than a given threshold. When estimating that the oncoming vehicle detected by the sensor is going to traverse the intersection and make a turn, the control unit increases the threshold.

Advantageous Effects of Invention

According to an aspect of the present invention, malfunctioning of the intersection AEB system can be prevented. Problems, configurations, and effects that are not described above will be made clear by the following description of embodiments.

DESCRIPTION OF EMBODIMENTS

Embodiments of a travel control device for vehicles according to the present invention will hereinafter be described with reference to the drawings.

Figure 1:
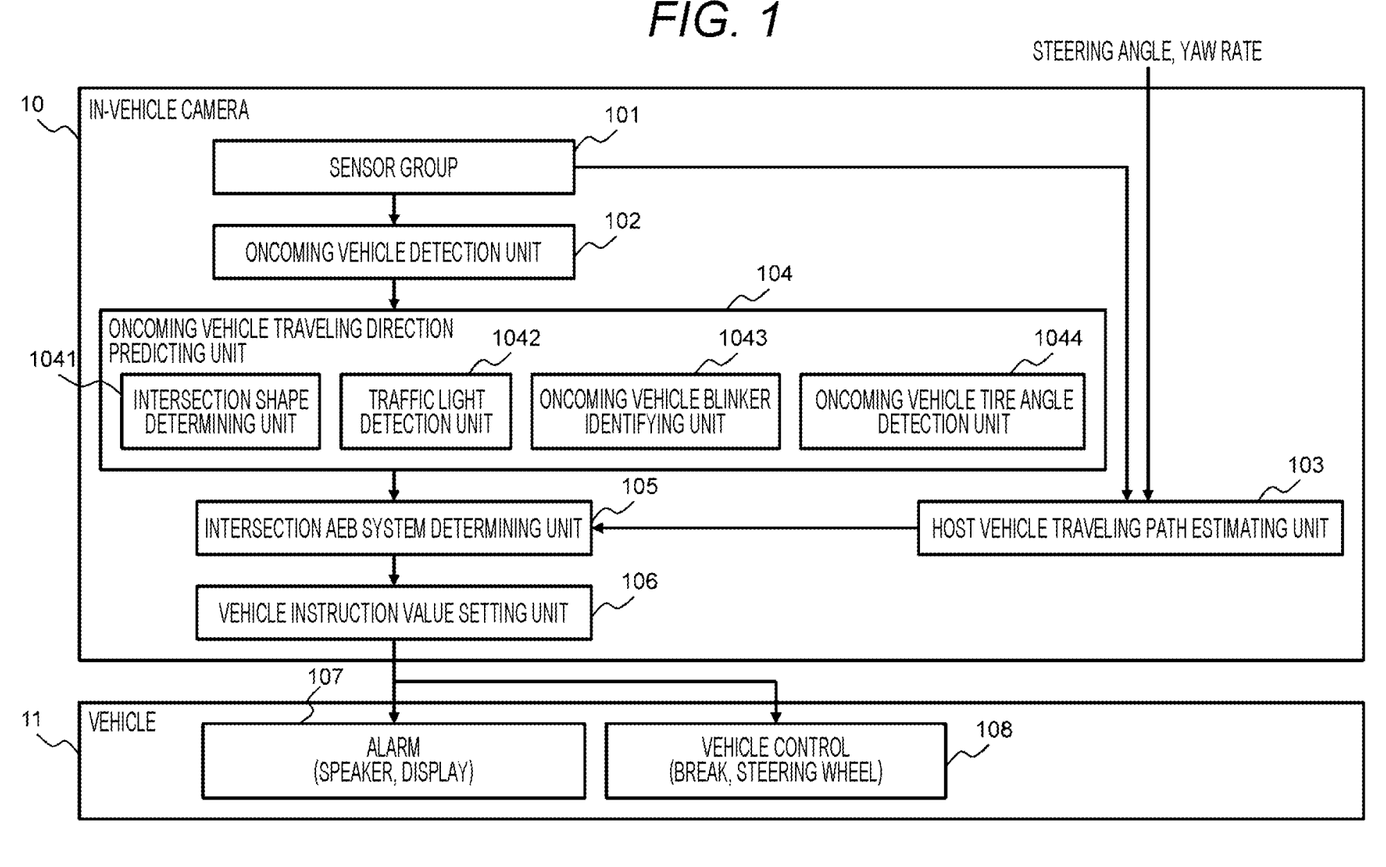
FIG. 1 is a block diagram of a travel control device for vehicles according to an embodiment of the present invention.

FIG. 1 is a block diagram of a travel control device for vehicles according to an embodiment of the present invention.

An in-vehicle camera 10 of this embodiment includes a read only memory (ROM) storing a traveling control algorithm, a central processing unit (CPU) that executes various computations, and a random access memory (RAM) storing computation results.

A sensor group 101 is composed of cameras that sense an object, and sends information of detection by sensors (cameras) to an oncoming vehicle detection unit 102 and to a host vehicle traveling path estimating unit 103.

The oncoming vehicle detection unit 102 is a mechanism that detects an oncoming vehicle, which is a target vehicle, based on detection information on a moving object that is sent from the sensor group 101, and that sends information on the detected oncoming vehicle, which is the target vehicle, to the oncoming vehicle traveling direction predicting unit 104.

The host vehicle traveling path estimating unit 103 estimates the traveling direction of a host vehicle, from information sent from the sensor group 101, a steering angle of the host vehicle, and a yaw rate of the host vehicle, and sends information on estimation of the traveling direction of the host vehicle to an intersection AEB system determining unit 105.

The oncoming vehicle traveling direction predicting unit 104 includes an intersection shape determining unit 1041, a traffic light detection unit 1042, an oncoming vehicle blinker identifying unit 1043, and an oncoming vehicle tire angle detection unit 1044. The oncoming vehicle traveling direction predicting unit 104 predicts the traveling direction of the oncoming vehicle, which is the target vehicle, and sends the result of prediction to the intersection AEB system determining unit 105.

The intersection AEB system determining unit 105 determines whether or not to actuate an intersection AEB system, using the result of prediction of the traveling direction of the oncoming vehicle, the results being transmitted from the oncoming vehicle traveling direction predicting unit 104, and the information on estimation of the traveling direction of the host vehicle, the information being transmitted from the host vehicle traveling path estimating unit 103, and transmits a control policy resulting from the determination, to a vehicle instruction value setting unit 106.

The vehicle instruction value setting unit 106 calculates a control instruction value for an actual vehicle, from the control policy sent from the intersection AEB system determining unit 105, and sends a control signal based on the calculated control instruction value, to an alarm unit 107 and a vehicle control unit 108 of a vehicle 11.

According to the control signal transmitted from the vehicle instruction value setting unit 106, the alarm unit 107 gives an alarm to a driver by outputting an alarm sound from a speaker or putting an alarm message on a display device.

According to the control signal transmitted from the vehicle instruction value setting unit 106, the vehicle control unit 108 controls a brake and a steering wheel.

A signal transmission means between the in-vehicle camera 10 and the vehicle 11 is provided as a controller area network (CAN), Ethernet (registered trademark), or the like, which are commonly used as in-vehicle networks, and allows data transmission/reception between devices connected to each other.

Figure 2:
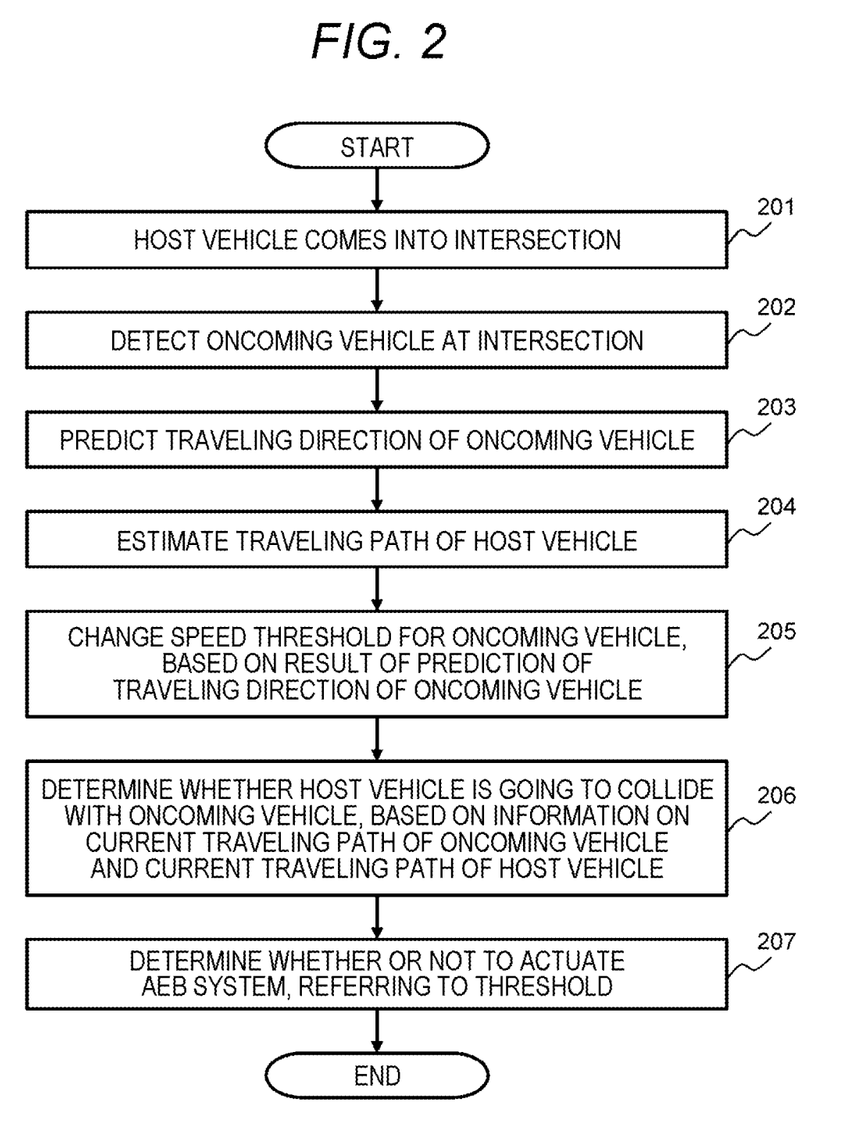
FIG. 2 is a flowchart of a process executed by an in-vehicle camera according to the embodiment of the present invention.

FIG. 2 is a flowchart of a process executed by the in-vehicle camera 10 according to the embodiment of the present invention.

First, the host vehicle traveling path estimating unit 103 detects that the host vehicle having come into an intersection has traversed the intersection and is about to make a turn (make a right turn in the case of left-hand traffic or make a left turn in the case of right-hand traffic) (201). In the case of left-hand traffic, for example, the host vehicle traveling path estimating unit 103 can detect the host vehicle being about to make a right turn, by detecting that the host vehicle is in a right-turn lane or the host vehicle's right blinker is on.

Subsequently, from detection information on a moving object, the oncoming vehicle detection unit 102 detects an oncoming vehicle at the intersection which the host vehicle has come into (202). The oncoming vehicle traveling direction predicting unit 104 predicts the traveling direction of the oncoming vehicle detected (203), as the host vehicle traveling path estimating unit 103 estimates the traveling path of the host vehicle (204). An oncoming vehicle traveling direction predicting process 203 by the oncoming vehicle traveling direction predicting unit 104 and a host vehicle traveling path estimating process 204 by the host vehicle traveling path estimating unit 103 may be executed in sequence or in parallel.

Then, based on the result of prediction of the traveling direction of the oncoming vehicle, the intersection AEB system determining unit 105 changes a speed threshold for the oncoming vehicle, the speed threshold being a threshold at which the intersection AEB system is actuated (205), determines whether the host vehicle is going to collide with the oncoming vehicle, from information on the current traveling path of the oncoming vehicle and the same of the host vehicle (206), and determines whether or not to actuate the intersection AEB system, referring to the threshold (207). At step 207, actuation of the intersection AEB system is determined when a possibility of the collision is high and at the same time, the speed of the oncoming vehicle is higher than the threshold. In other words, if the speed of the oncoming vehicle is lower than the threshold, the intersection AEB system is not actuated even if the possibility of the collision is determined to be high.

Each unit making up the in-vehicle camera 10 is provided as a computer (microcomputer) including an arithmetic processing unit and a memory.

The arithmetic processing unit includes a processor, and executes a program stored in the memory. Part of a process the arithmetic processing unit executes by running the program may be executed by a different arithmetic processing unit (e.g., hardware-based arithmetic processing unit, such as a field programmable gate array (FPGA)) or an application specific integrated circuit (ASIC)).

The memory includes a ROM, which is a nonvolatile storage element, and a RAM. The ROM stores an unchangeable program (e.g., BIOS) and the like. The RAM is a volatile storage element allowing high-speed access, such as a dynamic random access memory (DRAM), or a nonvolatile storage element, such as a static random access memory (SRAM), and stores a program, which is executed by the arithmetic processing unit, and data, which is used for execution of the program. The program executed by the arithmetic processing unit is stored in a nonvolatile storage device, which is a non-transitory storage medium.

Figure 3:
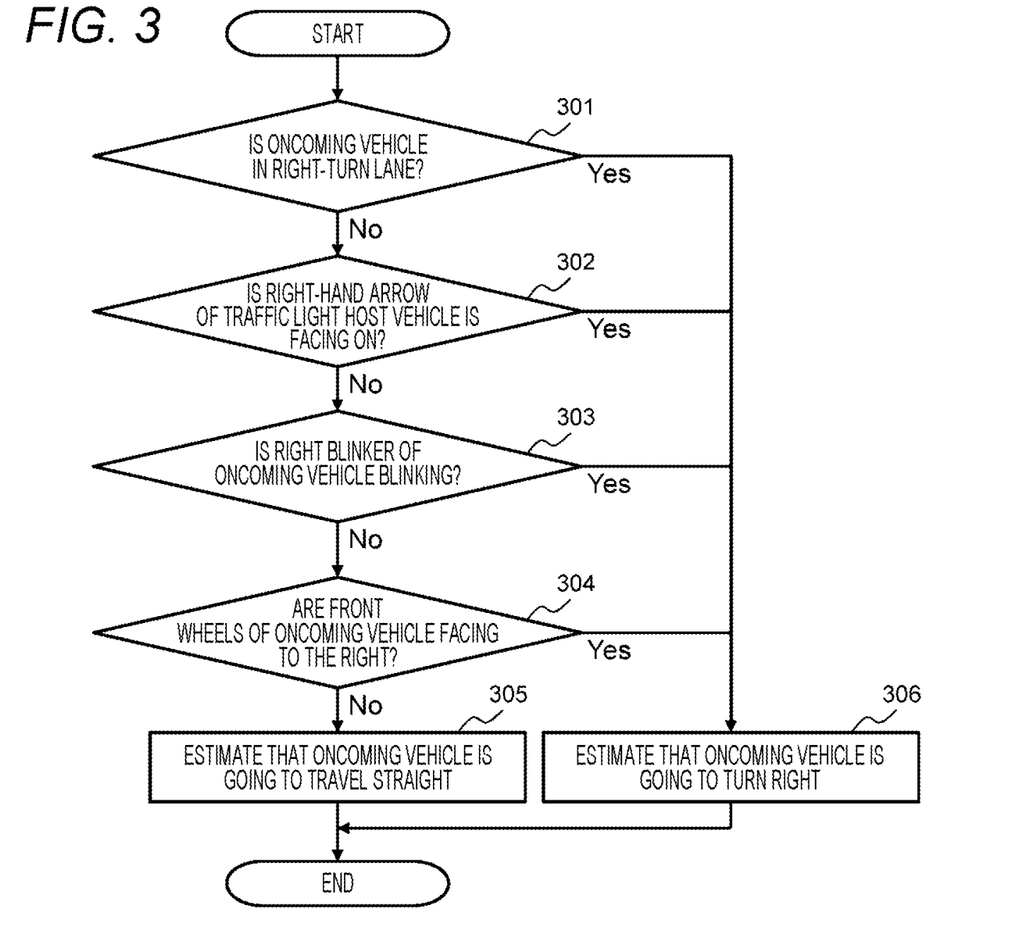
FIG. 3 is a flowchart showing the details of an oncoming vehicle traveling direction predicting process according to the embodiment of the present invention.

FIG. 3 is a flowchart showing the details of the oncoming vehicle traveling direction predicting process 203 according to the embodiment of the present invention, showing the process that is executed in a case where the host vehicle keeping to the left turns right.

First, the oncoming vehicle traveling direction predicting unit 104 determines whether an oncoming vehicle is present in a right-turn lane (301), and when the oncoming vehicle is present in the right-turn lane, proceeds to step 306. When the oncoming vehicle is not present in the right-turn lane, the oncoming vehicle traveling direction predicting unit 104 determines whether a right-turn signal (right-hand arrow) of a traffic light the host vehicle is facing is on (302), and when the right-hand arrow of the traffic light the host vehicle is facing is on, proceeds to step 306. When the right-hand arrow of the traffic light the host vehicle is facing is not on, the oncoming vehicle traveling direction predicting unit 104 determines whether a right blinker of the oncoming vehicle is blinking (303). When the right blinker of the oncoming vehicle is blinking, the oncoming vehicle traveling direction predicting unit 104 proceeds to step 306. When the right blinker of the oncoming vehicle is not blinking, the oncoming vehicle traveling direction predicting unit 104 determines whether the front wheels of the oncoming vehicle are facing to the right (304), and when the front wheels of the oncoming vehicle are facing to the right, proceeds to step 306. When the front wheels of the oncoming vehicle are not facing to the right, the oncoming vehicle traveling direction predicting unit 104 estimates that the oncoming vehicle is going to travel straight (305).

When at least one of four conditions described above is met, it is estimated that the oncoming vehicle is going to turn right (306). To determine whether the oncoming vehicle is going to turn right, conditions are not limited to the above four conditions, but other conditions may be used or only some of the four conditions may be used. Whether the oncoming vehicle is going to turn right is determined in the following manner. As indicated in the flowchart, the oncoming vehicle's being going to turn right is determined when one of the four conditions is met, or the oncoming vehicle's being going to turn right is determined by decision of a majority of multiple conditions, or the oncoming vehicle's being going to turn right is determined by using the result of comparison between the total of scores given by weighting multiple conditions and a given threshold.

The above pieces of information for determining whether the oncoming vehicle is going to turn right are all obtained by the cameras making up the sensor group 101.

Figure 4:
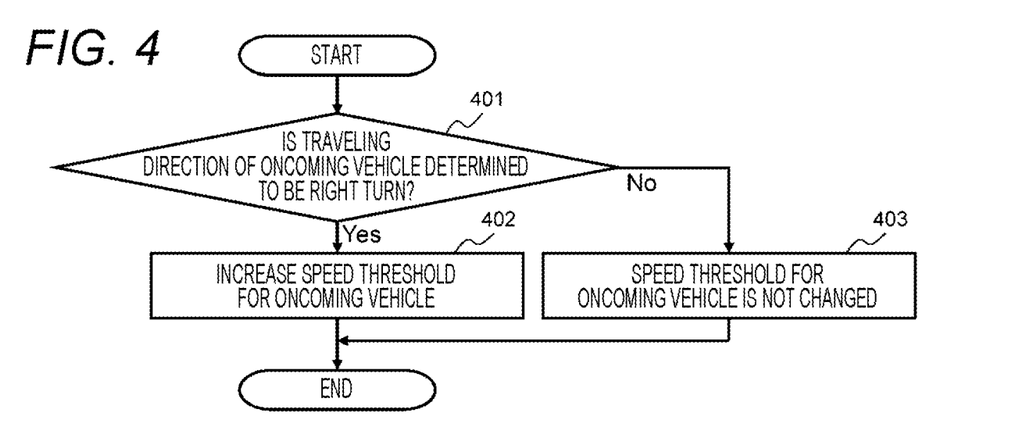
FIG. 4 is a flowchart of an oncoming vehicle speed threshold setting process according to the embodiment of the present invention.

FIG. 4 is a flowchart of an oncoming vehicle speed threshold setting process 205 according to the embodiment of the present invention, showing the process that is executed in a case of making a right turn in left-hand traffic.

First, the intersection AEB system determining unit 105 determines whether the traveling direction of the oncoming vehicle is estimated to be a right turn (401), and when the traveling direction of the oncoming vehicle is estimated to be the right turn, increases the speed threshold for the oncoming vehicle (402) but when the traveling direction of the oncoming vehicle is not estimated to be the right turn, does not change the speed threshold for the oncoming vehicle (403).

Examples to which the embodiment of the present invention is applied will hereinafter be described.

First Example

In a first example, a travel control device suitable for left-hand traffic will be described. The travel control device according to the first example has a configuration shown in FIG. 1 and executes a process shown in FIG. 2. As indicated in FIG. 3, the oncoming vehicle traveling direction predicting unit 104 determines whether the oncoming vehicle is going to turn right, using information acquired from the cameras that are the sensor group 101. As indicated in FIG. 4, when the oncoming vehicle traveling direction predicting unit 104 estimates the traveling direction of the oncoming vehicle to be a right turn, the intersection AEB system determining unit 105 sets a larger speed threshold for the oncoming vehicle.

Figure 5:
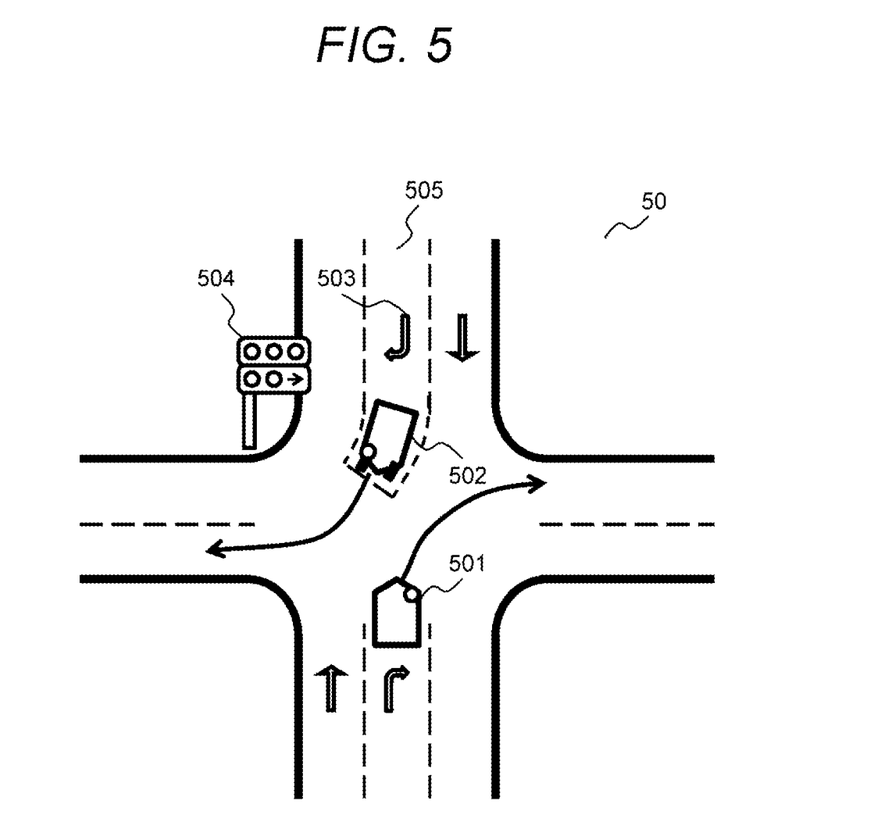
FIG. 5 depicts a relationship between a host vehicle and an oncoming vehicle, according to a first example.

As described above, when a host vehicle 501 has come into an intersection 50 shown in FIG. 5, the travel control device of the first example detects an oncoming vehicle 502 by the sensor group 101 (cameras), and estimates the traveling direction of the oncoming vehicle 502 from information on whether the oncoming vehicle 502 is in a right-turn lane 505, which is determined from the shape of the intersection 50, on whether a right-turn signal (right-hand arrow) of a traffic light 504 the host vehicle 501 is facing is on, on whether a right blinker of the oncoming vehicle 502 is blinking, and on whether the front wheels of the oncoming vehicle 502 are facing to the right. When estimating the traveling direction of the oncoming vehicle 502 to be a right turn, the travel control device sets a larger speed threshold for the oncoming vehicle, the speed threshold being a threshold at which the intersection AEB system is actuated, thereby preventing malfunctioning of the intersection AEB system.

Second Example

Figure 6:
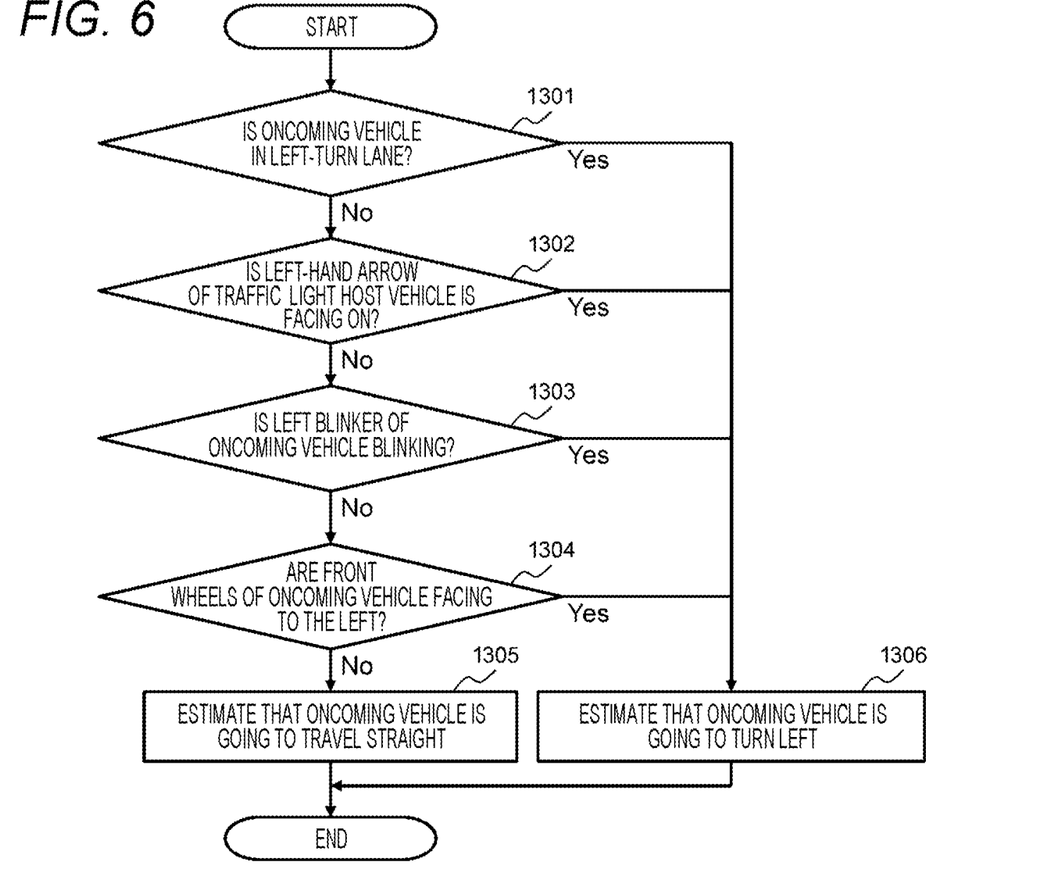
FIG. 6 is a flowchart showing the details of the oncoming vehicle traveling direction predicting process according to the embodiment of the present invention.
Figure 7:
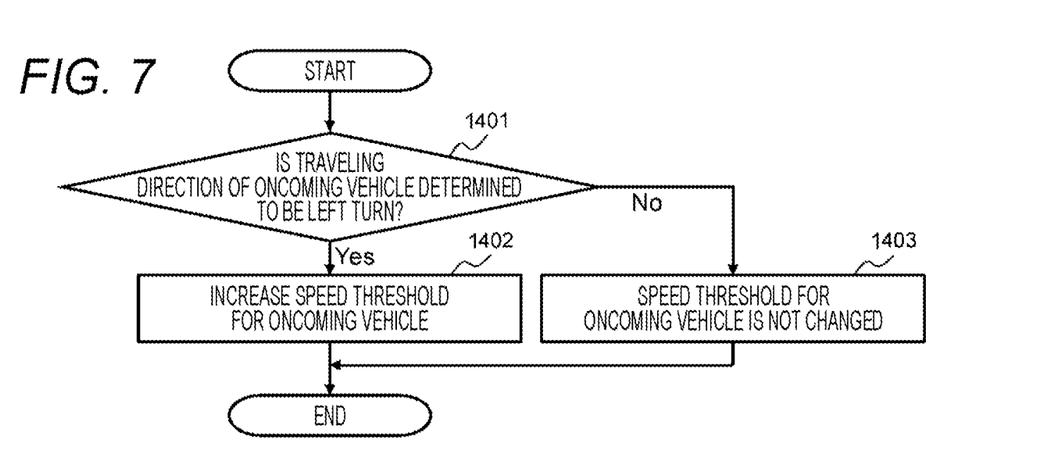
FIG. 7 is a flowchart of the oncoming vehicle speed threshold setting process according to the embodiment of the present invention.

In a second example, a travel control device suitable for left-hand traffic will be described. The travel control device according to the second example has the configuration shown in FIG. 1 and executes the process shown in FIG. 2. As indicated in FIG. 6, the oncoming vehicle traveling direction predicting unit 104 determines whether the oncoming vehicle is going to turn left, using information acquired from the cameras that are the sensor group 101. As indicated in FIG. 7, when the oncoming vehicle traveling direction predicting unit 104 estimates the traveling direction of the oncoming vehicle to be a left turn, the intersection AEB system determining unit 105 sets a larger speed threshold for the oncoming vehicle.

FIG. 6 is a flowchart showing the details of the oncoming vehicle traveling direction predicting process 203 according to the embodiment of the present invention, showing the process that is executed in a case of making a left turn in right-hand traffic.

First, the oncoming vehicle traveling direction predicting unit 104 determines whether an oncoming vehicle is present in a left-turn lane (1301), and when the oncoming vehicle is present in the left-turn lane, proceeds to step 1306. When the oncoming vehicle is not present in the left-turn lane, the oncoming vehicle traveling direction predicting unit 104 determines whether left-turn signal (left-hand arrow) of a traffic light the host vehicle is facing is on (1302), and when the left-hand arrow of the traffic light the host vehicle is facing is on, proceeds to step 1306. When the left-hand arrow of the traffic light the host vehicle is facing is not on, the oncoming vehicle traveling direction predicting unit 104 determines whether a left blinker of the oncoming vehicle is blinking (1303). When the left blinker of the oncoming vehicle is blinking, the oncoming vehicle traveling direction predicting unit 104 proceeds to step 1306. When the left blinker of the oncoming vehicle is not blinking, the oncoming vehicle traveling direction predicting unit 104 determines whether the front wheels of the oncoming vehicle are facing to the left (1304), and when the front wheels of the oncoming vehicle are facing to the left, proceeds to step 1306. When the front wheels of the oncoming vehicle are not facing to the left, the oncoming vehicle traveling direction predicting unit 104 estimates that the oncoming vehicle is going to travel straight (1305).

When at least one of four conditions described above is met, it is estimated that the oncoming vehicle is going to turn left (1306). To determine whether the oncoming vehicle is going to turn left, conditions are not limited to the above four conditions, but other conditions may be used or only some of the four conditions may be used. Whether the oncoming vehicle is going to turn left is determined in the following manner. As indicated in the flowchart, the oncoming vehicle's being going to turn left is determined when one of the four conditions is met, or the oncoming vehicle's being going to turn left is determined by decision of a majority of multiple conditions, or the oncoming vehicle's being going to turn left is determined by using the result of comparison between the total of scores given by weighting multiple conditions and a given threshold.

The above pieces of information for determining whether the oncoming vehicle is going to turn left are all obtained by the cameras making up the sensor group 101.

FIG. 7 is a flowchart of the oncoming vehicle speed threshold setting process 205 according to the embodiment of the present invention, showing the process that is executed in a case of making a left turn in right-hand traffic.

First, the intersection AEB system determining unit 105 determines whether the traveling direction of the oncoming vehicle is estimated to be a left turn (1401), and when the traveling direction of the oncoming vehicle is estimated to be the left turn, increases the speed threshold for the oncoming vehicle (1402) but when the traveling direction of the oncoming vehicle is not estimated to be the left turn, does not change the speed threshold for the oncoming vehicle (1403).

Figure 8:
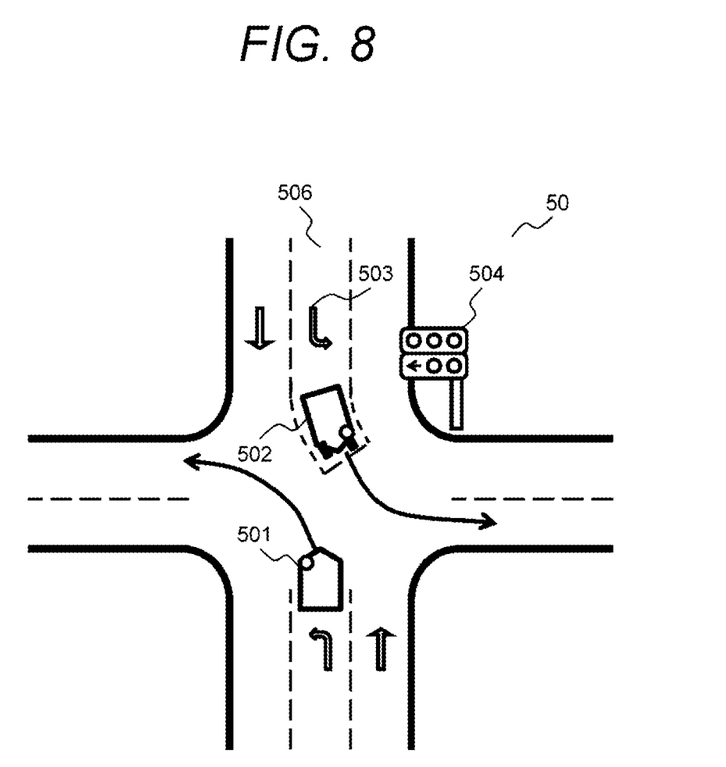
FIG. 8 depicts a relationship between the host vehicle and the oncoming vehicle, according to the first example.

As described above, when the host vehicle 501 has come into the intersection 50 shown in FIG. 8, the travel control device of the second example detects the oncoming vehicle 502 by the sensor group 101 (cameras), and estimates the traveling direction of the oncoming vehicle 502 from information on whether the oncoming vehicle 502 is in a left-turn lane 506, which is determined from the shape of the intersection 50, on whether a left-turn signal (left-hand arrow) of the traffic light 504 the host vehicle 501 is facing is on, on whether a left blinker of the oncoming vehicle 502 is blinking, and on whether the front wheels of the oncoming vehicle 502 are facing to the left. When estimating the traveling direction of the oncoming vehicle 502 to be a left turn, the travel control device sets a larger speed threshold for the oncoming vehicle, the speed threshold being a threshold at which the intersection AEB system is actuated, thereby preventing malfunctioning of the intersection AEB system.

Third Example

Figure 9:
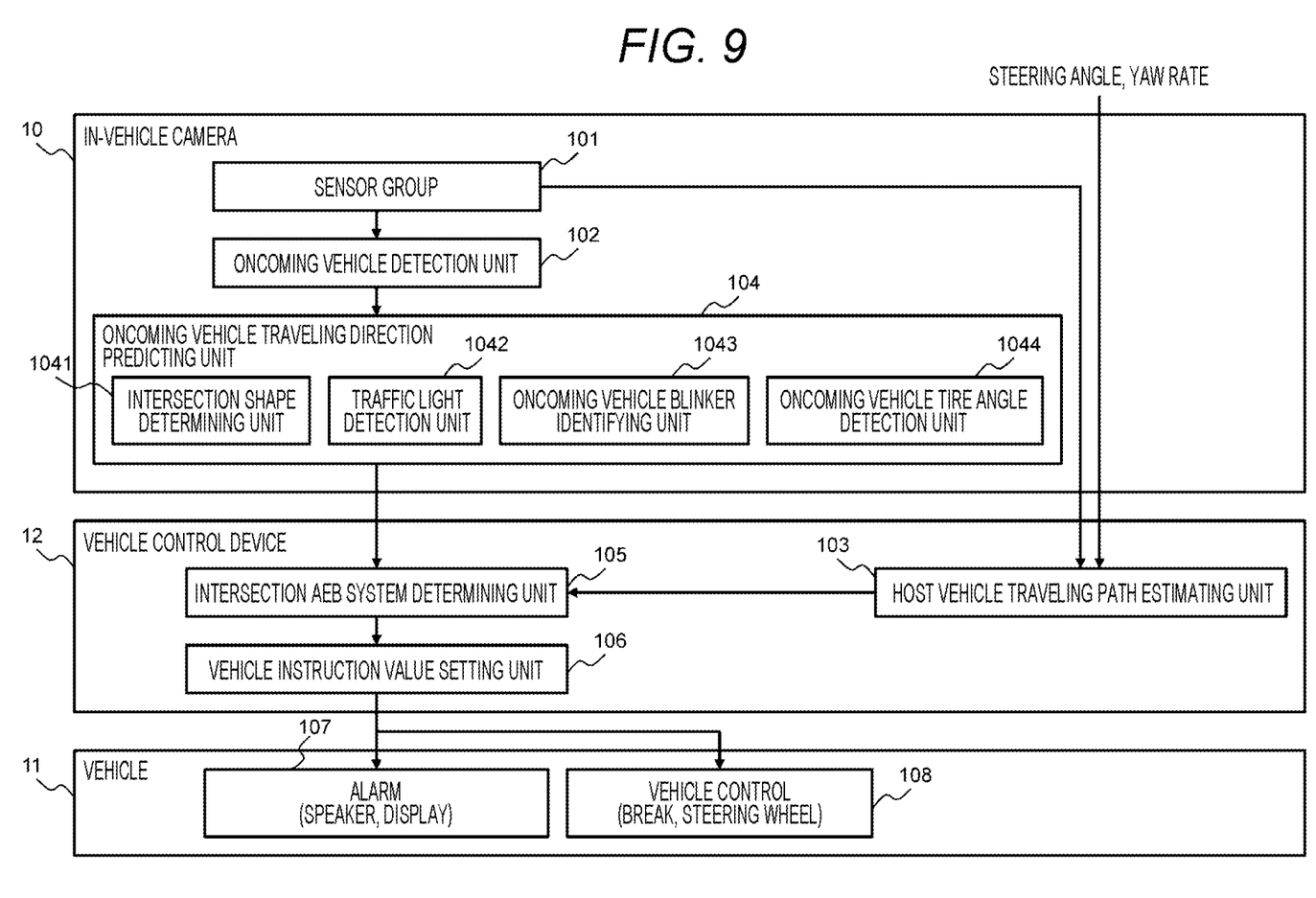
FIG. 9 is a block diagram of a travel control device for vehicles according to a third example.

A travel control device according to a third example has a configuration shown in FIG. 9. In this configuration, the in-vehicle camera 10 does not need to have all functions. For example, the in-vehicle camera 10 includes the sensor group 101, the oncoming vehicle detection unit 102, and the oncoming vehicle traveling direction predicting unit 104, and a vehicle control device 12 includes the host vehicle traveling path estimating unit 103, the intersection AEB system determining unit 105, and the vehicle instruction value setting unit 106. These units execute the processes shown in FIGS. 2, 3, and 4 in the same manner as in the first example.

Each unit of the vehicle control device 12 is composed of a computer (microcomputer) including an arithmetic processing unit and a memory.

The arithmetic processing unit includes a processor, and executes a program stored in the memory. Part of a process the arithmetic processing unit executes by running the program may be executed by a different arithmetic processing unit (e.g., hardware-based arithmetic processing unit, such as a field programmable gate array (FPGA)) or an application specific integrated circuit (ASIC)).

The memory includes a ROM, which is a nonvolatile storage element, and a RAM. The ROM stores an unchangeable program (e.g., BIOS) and the like. The RAM is a volatile storage element allowing high-speed access, such as a dynamic random access memory (DRAM), or a nonvolatile storage element, such as a static random access memory (SRAM), and stores a program, which is executed by the arithmetic processing unit, and data, which is used for execution of the program. The program executed by the arithmetic processing unit is stored in a nonvolatile storage device, which is a non-transitory storage medium.

Fourth Example

A travel control device of a fourth example carries out the oncoming vehicle traveling direction predicting process 203 different from the oncoming vehicle traveling direction predicting process 203 carried out in the first example.

Figure 10:
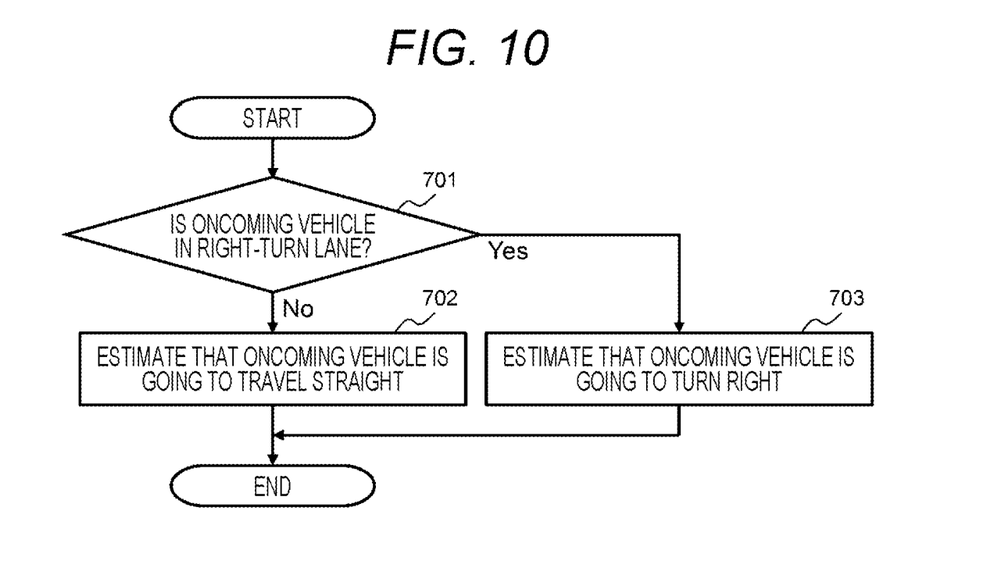
FIG. 10 is a flowchart of an example of an oncoming vehicle traveling direction predicting process according to a fourth example.

FIG. 10 is a flowchart of an example of the oncoming vehicle traveling direction predicting process 203 according to the fourth example. First, the oncoming vehicle traveling direction predicting unit 104 determines whether an oncoming vehicle is present in a right-turn lane (701), and when the oncoming vehicle is present in the right-turn lane, estimates that the oncoming vehicle is going to turn right (703) but, when the oncoming vehicle is not present in the right-turn lane, estimates that the oncoming vehicle is going to travel straight (702).

Figure 11:
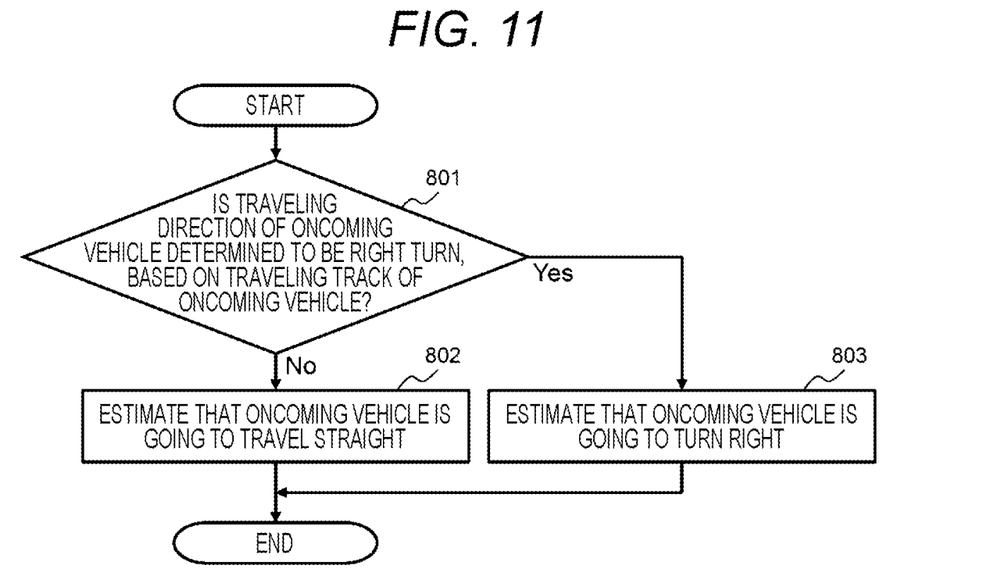
FIG. 11 is a flowchart of another example of the oncoming vehicle traveling direction predicting process according to the fourth example.

FIG. 11 is a flowchart of another example of the oncoming vehicle traveling direction predicting process 203 according to the fourth example. First, the oncoming vehicle traveling direction predicting unit 104 determines whether the traveling direction of an oncoming vehicle is a right turn, based on information on a traveling track of the oncoming vehicle (801). When determining that the traveling direction of the oncoming vehicle is the right turn, the oncoming vehicle traveling direction predicting unit 104 estimates that the oncoming vehicle is going to turn right (803) but, when not determining that the traveling direction of the oncoming vehicle is the right turn, estimates that the oncoming vehicle is going to travel straight (802). Whether the oncoming vehicle is going to turn right may be determined based on traveling path information acquired from the oncoming vehicle through vehicle-to-vehicle communication.

As described above, the travel control device according to the embodiment of the present invention includes a sensor (sensor group 101) that detects the front side; and a control unit that controls the brake, based on information from the sensor group 101. When determining that the host vehicle is going to traverse an intersection and make a turn (make a right turn in the case of left-hand traffic or make a left turn in the case of right-hand traffic), the control unit (vehicle instruction value setting unit 106) carries out control for controlling the brake when the speed of the oncoming vehicle is equal to or higher than the given threshold. When estimating that the oncoming vehicle detected by the sensor group 101 is going to traverse the intersection and make a turn, the control unit (intersection AEB system determining unit 105) increases the threshold. As a result, even when the oncoming vehicle is coming in the intersection at a low speed, the intersection AEB system is properly actuated to prevent its malfunctioning. In addition, malfunction of the intersection AEB system can be prevented solely by the information acquired by the in-vehicle camera without using map information, V2X, or the like.

The present invention is not limited to the above-described embodiment/examples, and includes various modifications and configurations equivalent thereto, which are within the scope of the appended claims. For example, the embodiment/examples have been described in detail above in order to facilitate understanding of the present invention. The present invention is, therefore, not necessarily limited to an embodiment/example including all constituent elements described above. Some constituent elements of a certain embodiment/example may be replaced with constituent elements of another embodiment/example. Further, a constituent element of another embodiment/example may be added to a constituent element of a certain embodiment/example.

Furthermore, some constituent elements of each embodiment/example may be deleted, or add to or replaced with constituent elements of another embodiment.

Some or all of the above-described constituent elements, functions, processing units, processing means, and the like may be provided in the form of hardware by packaging them in an integrated circuit, or in the form of software by causing a processor to interpret and execute programs that implement respective functions.

Information on programs, tables, files, and the like for implementing various functions may be stored in a storage device, such as a memory, a hard disk, and a solid state drive (SSD), or in a recording medium, such as an IC card, an SD card, and a DVD.

A group of control lines and data lines considered to be necessary for description are illustrated, and all control lines and information lines needed for configuration are not necessarily illustrated. It is safe to assume that, actually, almost the entire constituent elements are interconnected.

REFERENCE SIGNS LIST

- 10 in-vehicle camera
- 11 vehicle
- 12 vehicle control device
- 101 sensor group
- 102 oncoming vehicle detection unit
- 103 host vehicle traveling path estimating unit
- 104 oncoming vehicle traveling direction predicting unit
- 105 intersection AEB system determining unit
- 106 vehicle instruction value setting unit
- 107 alarm (speaker, display)
- 108 vehicle control (brake, steering wheel)
- 1041 intersection shape determining unit
- 1042 traffic light detection unit
- 1043 oncoming vehicle blinker identifying unit
- 1044 oncoming vehicle tire angle detection unit

The invention claimed is:

1. A travel control device comprising:
    a sensor that detects a front side; and
    a control unit that controls a brake, based on information from the sensor,
    wherein
    when determining that a host vehicle is going to traverse an intersection and make a turn, the control unit carries out control for controlling the brake when a speed of an oncoming vehicle is equal to or higher than a given threshold, and
    when estimating that the oncoming vehicle detected by the sensor is going to traverse the intersection and make a turn, the control unit increases the threshold.

2. The travel control device according to claim 1, wherein the control unit determines that an oncoming vehicle is going to traverse an intersection and make a turn when one of following conditions is met, the following conditions including
    (a) a condition that the oncoming vehicle detected by a sensor is in a lane for traversing the intersection and making a turn,
    (b) a condition that an arrow pointing a direction of traversing the intersection and making a turn is turned on in a traffic light a host vehicle is facing,
    (c) a condition that a blinker of the oncoming vehicle is blinking, the blinker indicating the direction of traversing the intersection and making a turn, and
    (d) a condition that front wheels of the oncoming vehicle are facing to the direction of traversing the intersection and making a turn.

3. The travel control device according to claim 1, wherein the control unit determines whether an oncoming vehicle is going to traverse an intersection and make a turn, based on a traveling track of the oncoming vehicle.

4. A travel control method for vehicles that is executed by a travel control device,
    wherein the travel control device includes
    a sensor that detects a front side, and
    a control unit that controls a brake, based on information from the sensor,
    the travel control method comprising:
    causing the control unit to carry out control for controlling the brake when a speed of an oncoming vehicle is equal to or higher than a given threshold in a case where the control unit determines that a host vehicle is going to traverse an intersection and make a turn; and
    causing the control unit to increase the threshold when the control unit estimates that the oncoming vehicle detected by the sensor is going to traverse the intersection and make a turn.

* * * * *